United States Patent
Harris et al.

(10) Patent No.: US 10,726,606 B2
(45) Date of Patent: Jul. 28, 2020

(54) SHADER PROGRAM SELECTION IN GRAPHICS PROCESSING SYSTEMS

(71) Applicant: Arm Limited, Cambridge (GB)

(72) Inventors: Peter William Harris, Cambridge (GB); Mladen Wilder, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/279,882

(22) Filed: Feb. 19, 2019

(65) Prior Publication Data
US 2019/0259193 A1    Aug. 22, 2019

(30) Foreign Application Priority Data

Feb. 21, 2018   (GB) .................................. 1802773.0

(51) Int. Cl.
| | |
|---|---|
| *G06T 1/20* | (2006.01) |
| *G09G 5/36* | (2006.01) |
| *G06T 15/80* | (2011.01) |
| *G06T 15/00* | (2011.01) |
| *G06F 11/30* | (2006.01) |
| *G06F 11/34* | (2006.01) |

(52) U.S. Cl.
CPC ........ *G06T 15/005* (2013.01); *G06F 11/3017* (2013.01); *G06F 11/3466* (2013.01); *G06T 1/20* (2013.01); *G06T 15/80* (2013.01); *G09G 5/363* (2013.01)

(58) Field of Classification Search
None
See application file for complete search history.

(56) References Cited

U.S. PATENT DOCUMENTS

| | | | | |
|---|---|---|---|---|
| 7,849,332 | B1* | 12/2010 | Alben ..................... | G06F 1/206 713/300 |
| 2007/0018980 | A1* | 1/2007 | Berteig ................... | G06T 15/80 345/426 |
| 2008/0141131 | A1* | 6/2008 | Cerny .................. | G06F 11/3612 715/716 |
| 2016/0225118 | A1* | 8/2016 | Nevraev .................. | G06T 1/20 |

FOREIGN PATENT DOCUMENTS

WO    WO 2015/177691    11/2015

OTHER PUBLICATIONS

UK Combined Search and Examination Report dated Jul. 11, 2018, GB Patent Application No. GB1802773.0.

* cited by examiner

*Primary Examiner* — Joni Hsu
(74) *Attorney, Agent, or Firm* — Vierra Magen Marcus LLP

(57) ABSTRACT

When a shader program is to be executed by a graphics processor, the graphics processor is caused to execute at least two variants of the shader program and the operation of the graphics processor when executing execution threads for the different variants of the shader program is monitored. A variant of the shader program to be executed by subsequent execution threads that are to execute the shader program is then selected based on the monitoring of the operation of the shading stage when executing the execution threads for the different variants of the shader program.

19 Claims, 9 Drawing Sheets

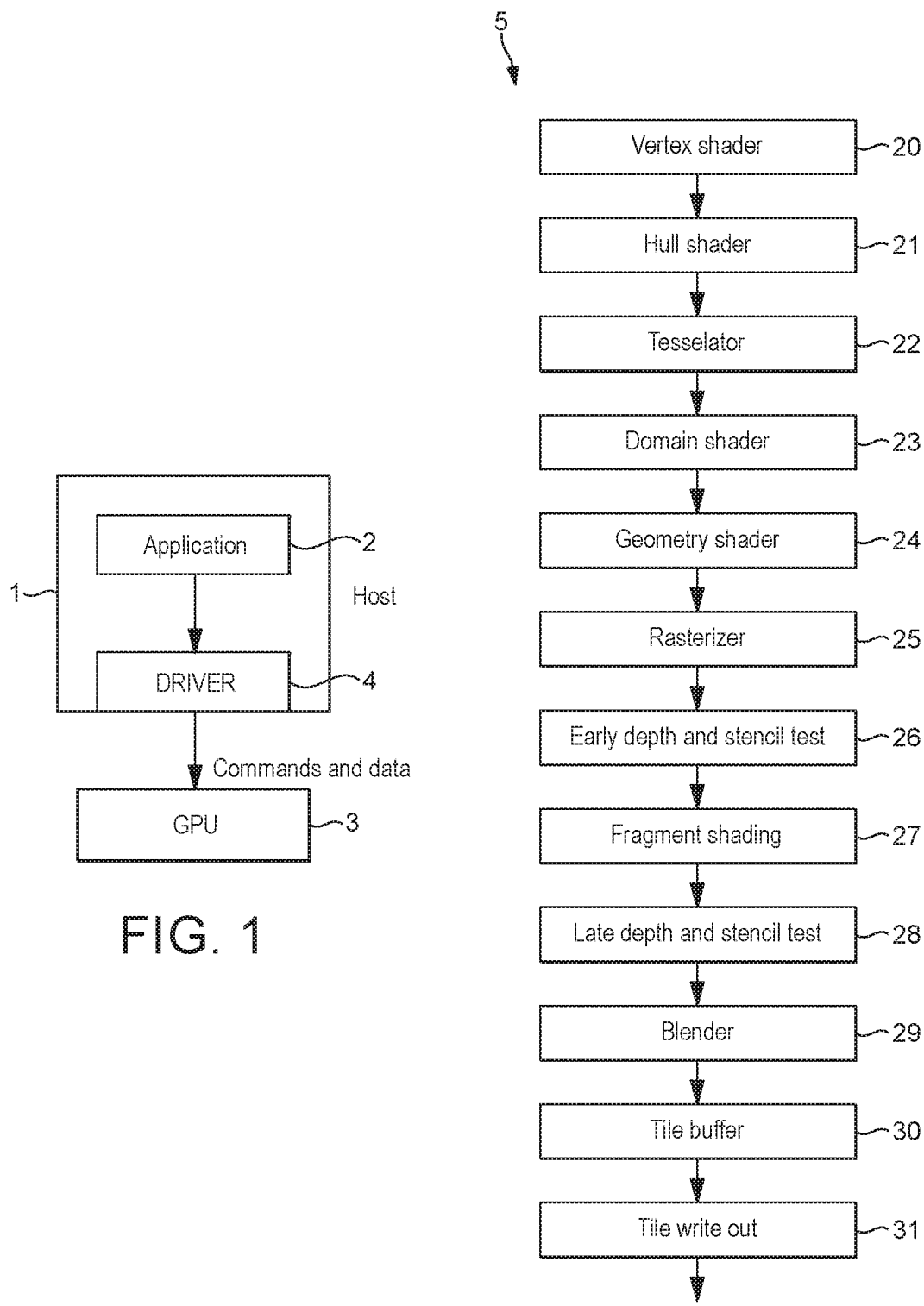

SHADER PROGRAM SELECTION IN GRAPHICS PROCESSING SYSTEMS

BACKGROUND

The technology described herein relates to graphics processing systems, and in particular to the operation of graphics processing systems that include one or more programmable processing stages ("shaders").

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a vertex shader and a fragment (pixel) shader. These shaders are programmable processing stages that execute shader programs on input data values to generate a desired set of output data (e.g. appropriately shaded and rendered fragment data in the case of a fragment shader) for processing by the rest of the graphics pipeline and/or for output.

Correspondingly, a graphics processor (a graphics processing unit (GPU)) that executes a graphics processing pipeline that includes one or more shaders will accordingly comprise one or more "shader cores" comprising appropriate programmable processing circuitry for executing the shader stages of the graphics processing pipeline. This programmable processing circuitry may comprise appropriate execution units and execution pipelines, such as one or more arithmetic execution units (arithmetic pipelines), load and store execution units (load and store pipelines), etc. The shaders of the graphics processing pipeline may share programmable processing circuitry and execution units, etc., or they may each be distinct programmable processing units and/or execution units, etc.

A graphics processing pipeline shader performs processing by running small programs for each "work item" in an output to be generated, such as a render target, e.g. frame. A "work item" in this case would usually be a vertex or a fragment (e.g. in the case of a fragment shader). Where the graphics processing pipeline is being used for "compute shading" (e.g. under OpenCL or DirectCompute) then the work items will be appropriate compute shading work items. The shader operation generally enables a high degree of parallelism, in that a typical render output, e.g. frame, will feature a large number of work items (e.g. of vertices or fragments), each of which is to be subjected to similar processing and can be processed independently.

In graphics shader operation, each work item is processed by means of an execution thread which will execute the shader program in question for the work item in question. As there will typically be a large number of work items (e.g. vertices or fragments), and thus corresponding threads, to be processed for a given shader program, the graphics processing system can be considered to be a massively multi-threaded system.

A shader program to be executed by a given "shader" of a graphics processing pipeline will be provided by the application that requires the processing by the graphics processing pipeline using a high-level shader programming language, such as GLSL, HLSL, OpenCL, etc. The shader program will consist of "expressions" indicating desired programming steps defined in the relevant language standards (specifications). The high-level shader program is then translated by a shader language compiler to binary code for the target graphics processing pipeline (for the shader core(s) executing the target graphics processing pipeline). This binary code will consist of "instructions" which are specified in the instruction set specification for the given target graphics processing pipeline. The compilation process for converting the shader language expressions to binary code instructions may take place via a number of intermediate representations of the program within the compiler. The compilation process is typically performed by the driver for the graphics processing unit (GPU) in question (that is, e.g., executing on a host processor of the overall data processing system that the graphics processing unit and graphics processing pipeline is part of), although other arrangements are possible.

It would be desirable as part of the shader compilation process to compile a shader program so as to make the shader program execution in use more efficient. However, because graphics processing systems are massively multi-threaded systems, and may therefore frequently execute threads which relate to different work item (e.g. fragment) output coordinates, and/or to plural work items (e.g. relating to different layers) corresponding to the same output coordinate (e.g. fragment) concurrently, the shader program performance for any single execution thread may not simply be a function of the shader program code for that thread, but may also be dependent on what other threads (which may also be executing a completely different shader program) are executing concurrently with that thread.

This then makes it difficult for the compilation process to be able to determine a more optimised arrangement for a given shader program to be executed, as the shader execution performance will depend on the actual runtime conditions encountered by the execution threads, such as what other threads are executing at the same time, which may vary and be dependent upon, e.g., the particular content of the particular render output region or regions currently being processed, which runtime conditions are difficult for a shader compiler (e.g. GPU driver) to be able to determine in advance (i.e. when it is compiling the shader program).

This is exacerbated in the case of multi-core graphics processing units that include plural processing cores, each able to execute a given shader program or programs for execution threads in parallel with other processing cores of the multi-core graphics processing unit.

The Applicants believe therefore that there remains scope for improvements to execution of shader programs in graphics processing pipelines that include one or more shader stages.

BRIEF DESCRIPTION OF THE DRAWINGS

A number of embodiments of the technology described herein will now be described by way of example only and with reference to the accompanying drawings, in which:

FIG. 1 shows an exemplary computer graphics processing system;

FIG. 2 shows schematically a graphics processing pipeline that can be operated in the manner of the technology described herein;

Like reference numerals are used for like components where appropriate in the drawings.

DETAILED DESCRIPTION

Figure 3:
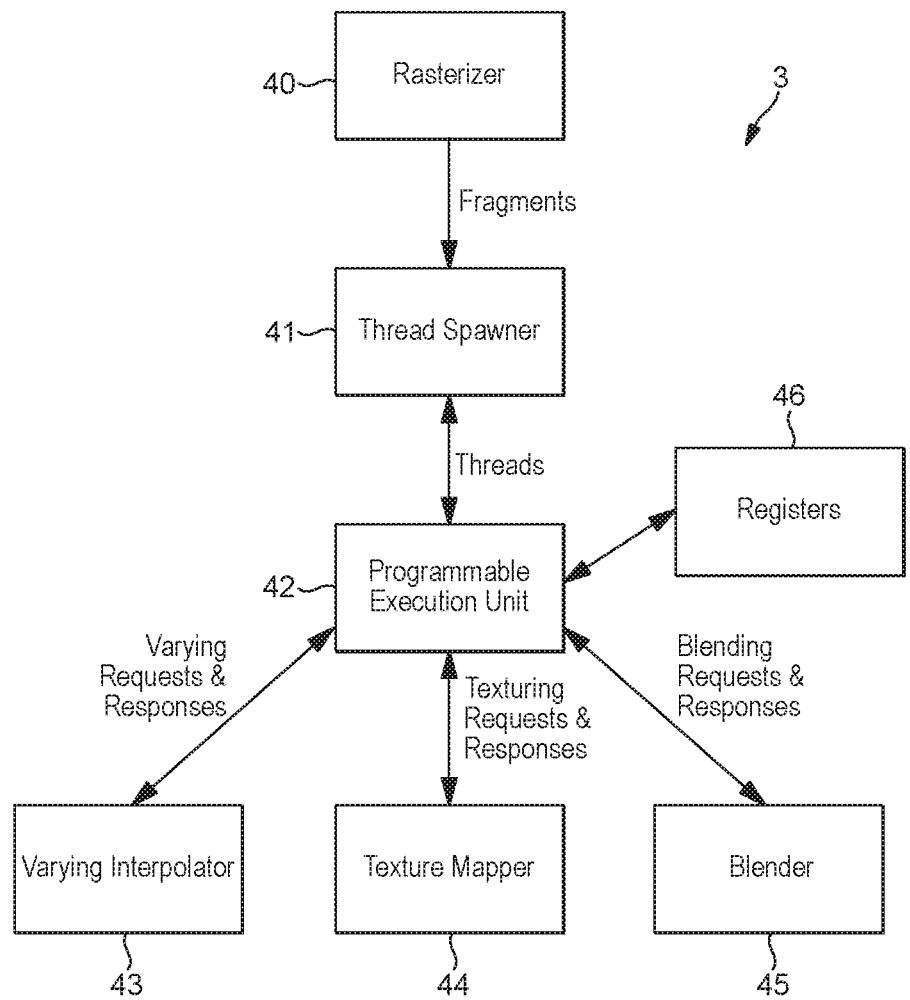
FIG. 3 shows schematically a graphics processing unit.

A first embodiment of the technology described herein comprises a method of operating a graphics processor that executes a graphics processing pipeline which includes a programmable shading stage that executes graphics shader programs to perform graphics shading operations, the method comprising:

for a shader program to be executed by the programmable shading stage to perform graphics shading operations:

providing to the graphics processor at least two variants of the shader program, each variant of the shader program comprising a different sequence of instructions to be performed when executing the shader program;

for each variant of the shader program, issuing plural execution threads for execution, so as to cause the shading stage to execute plural execution threads for each variant of the shader program;

the shading stage executing the execution threads so as to execute plural execution threads for each variant of the shader program;

monitoring the operation of the shading stage when executing the execution threads for the different variants of the shader program;

based on the monitoring of the operation of the shading stage when executing the execution threads for the different variants of the shader program, selecting a variant of the shader program to be executed by subsequent execution threads that are to execute the shader program;

issuing subsequent execution threads for execution, the subsequent execution threads being configured to cause the shading stage to execute the selected variant of the shader program; and the shading stage executing the subsequent execution threads so as to execute the selected variant of the shader program for the subsequent execution threads.

A second embodiment of the technology described herein comprises a graphics processing system comprising:

a graphics processor that executes a graphics processing pipeline which includes one or more programmable shading stages that execute graphics shader programs to perform graphics shading operations;

the graphics processing system further comprising:

a processing circuit operable to provide for a shader program to be executed by a programmable shading stage of the graphics processing pipeline to perform graphics shading operations, at least two variants of the shader program to the graphics processor, each variant of the shader program comprising a different sequence of instructions to be performed when executing the shader program;

and the graphics processor further comprising:

a programmable processing circuit operable to execute execution threads so as to execute a shader program provided to the graphics processor;

an execution thread issuing circuit operable to issue, for each variant of a received shader program to be executed by a programmable shading stage of the graphics processor, plural execution threads for execution, so as to cause the programmable processing circuit to execute plural execution threads for each variant of the shader program;

a thread execution monitoring circuit operable to monitor the operation of the programmable processing circuit of the graphics processor when it is executing execution threads for different variants of a shader program;

and a shader program variant selecting circuit operable to:

select a variant of a shader program to be executed by subsequent execution threads that are to execute the shader program based on monitoring of the operation of the programmable processing circuit when executing execution threads for different variants of the shader program by the thread execution monitoring circuit;

and to:

cause the execution thread issuing circuit to issue subsequent execution threads for execution by the programmable processing circuit, the subsequent execution threads being configured to cause the programmable processing circuit to execute the selected variant of the shader program.

The technology described herein relates to the execution of shader programs in graphics processing. In the technology described herein, two or more different variants of a shader program to be executed are generated and issued to a shading stage of a graphics processing pipeline, with the shading stage then executing execution threads to execute the two or more different versions of the shader program. The operation of the shader stage while executing threads executing the different versions of the shader program is monitored. The variant of the shader program to be executed by subsequent execution threads is then selected based on this monitoring. As will be discussed further below, this then allows the graphics processor to assess the operation of the different variants of the shader program under the current runtime conditions, and then to select, e.g., and in an embodiment, the more efficient variant of the shader program for the current runtime conditions to use for subsequent execution threads.

In other words, in the technology described herein, multiple shader program variants are initially run in parallel whilst monitoring the operation of those program variants, with the results of the monitoring then being used to select which one of the tested shader program variants should be favoured for subsequent execution threads that are to execute the shader program in question.

As will be discussed further below, this then facilitates more effective selection of a more efficient variant of a shader program to be executed by a shading stage of a graphics processing pipeline, whilst being able to take account of the current particular, e.g. runtime, conditions of execution of the shader program. It can therefore avoid the compiler having to, e.g., make a static choice as to the version of the shader program that it compiles and issues to the graphics processor for execution, and can allow, for example, more efficient shader program execution, in comparison, e.g., to arrangements in which the compiler simply tries to compile a particular, optimised, shader program for execution in advance of issuance of the shader program to the shading stage for execution.

The shader program for which the operation in the manner of the technology described herein is performed can be any suitable and desired shader program to be executed by a programmable shading stage of a graphics processing pipeline. Thus it may comprise, for example, a vertex shading program, a fragment shading program or a compute shading program, as desired. It is believed that the technology described herein may be particularly applicable to fragment shader operation, and so in one embodiment, the shader program is a fragment shading program (a program to perform graphics fragment shading operations).

Correspondingly, the programmable shading stage of the graphics processing pipeline may equally comprise any suitable and desired shading stage ("shader") of a graphics processing pipeline (and that a graphics processing pipeline can include or act as), such as a vertex shader or fragment shader or a compute shader. Again, in one embodiment, the programmable shading stage is a fragment shader.

The programmable shading stage will be, and in an embodiment is, implemented as (and the shader program is executed by) appropriate programmable processing circuitry of the graphics processor. In an embodiment there is a programmable execution unit ("shader core") that is operable to execute shading programs to perform processing operations. Thus the programmable execution unit will receive execution threads to be executed, and execute appropriate shading programs for those threads to generate the desired output.

The programmable processing circuitry (execution unit(s)) may operate solely as one type of shader, but the programmable processing circuitry (execution unit(s)) may typically be able to (and in an embodiment can) run plural different types of shader, i.e. such that the programmable processing circuitry (execution unit(s)) may be appropriately programmed, e.g. at different times, to function as one type of shader (e.g. as a fragment shader (to perform fragment shading operations)), and to function as other forms (types) of shader.

There may be a single or plural programmable execution units. Where there are plural programmable execution units, each execution unit can, in an embodiment, operate in the manner of the technology described herein. The or each programmable execution unit may comprise any suitable programmable hardware element such as programmable processing circuitry. Each programmable execution unit may be provided as a separate circuit element to other programmable execution units of the graphics processor or the programmable execution units may share some or all of their programmable processing circuitry.

The operation in the manner of the technology described herein to monitor the execution of different variants of a shader program and subsequently select one of the variants of the shader program to be executed by subsequent execution threads that are to execute the shader program could be performed for any suitable and, e.g., identifiable, amount of graphics processing ("unit" of graphics processing work or graphics processing "task") that the graphics processor is to perform.

For example, the operation in the manner of the technology described herein could be performed on a render output by render output basis (for respective render outputs), e.g., and in an embodiment, so as to test and then select a variant of a shader program to use for a respective render output, such as a frame (an image) to be displayed (and in one embodiment, this is done).

In this case, the testing of the different variants of the shader program and the subsequent selection and execution of a preferred variant of the shader program in the manner of the technology described herein could be performed for the same render output (e.g. with the testing of the different variants of the shader program being performed for some initial processing of the render output (e.g. of an initial sub-region or regions of the render output), and the subsequently selected preferred variant then being used for the remainder of the render output), or it would, e.g., be possible, to test variants of the shader program for one (or more) render output, and then use the results of that testing to select the variant of the shader program to use for a subsequent, different render output. For example, a first frame could be processed using a first variant of the shader program, a second frame could be processed using a second variant of the shader program, and then the results for those frames used to select the shader program variant to use for a third, later frame, and so on.

In an embodiment, the operation in the manner of the technology described herein is used to control and select the variant of a shader program to use within a given single render output being generated. In this case therefore, there would be some testing of the different variants of the shader program performed while performing, e.g., some but not all of the processing for the render output in question, with one of the variants of the shader program then being selected for subsequent processing of some or all of the render output in question.

In this case, the testing and selection of the shader program variants could be performed (once) for the render output as a whole (such that there would be some testing of the different variants of the shader program performed while performing, e.g., some but not all of the processing for the render output in question, with one of the variants of the shader program then being selected for subsequent processing of the remainder of the render output), or it could be performed for smaller subdivisions of the overall processing for the render output in question. For example, shader program variants could be, and are in an embodiment, tested and selected for particular "units" of processing within a render output being generated, such as, and in an embodiment, for one or more of: respective draw calls or sets of draw calls for a render output; respective primitives or sets of primitives for a render output; and respective regions (e.g. processing tiles or sets of plural processing tiles) of a render output. In this case again, there may be some initial processing for the processing unit (e.g. region or draw call) in question performed using the plural different variants of the shader program, with subsequent (e.g. the remaining) processing for that processing unit (e.g. region or draw call) then using the selected variant of the shader program.

In an embodiment, shader program variants are tested and selected for respective regions (areas) of a render output being generated. In this case, each region is in an embodiment the same size and configuration and, in an embodiment, corresponds to a respective portion (fraction) of the overall render output. The render output could be divided into as many regions as desired for this purpose, such as, for example, 2, 4, 9 or 16 regions.

(In general it is preferred to have test regions that provide better spatial locality to the remaining work that needs processing. By subdividing the output into regions, each with a local test region, different variant choices can be made for different regions of the output to reflect local execution conditions in the respective regions.)

In an embodiment, as well as testing and selecting shader program variants for respective regions of a render output, the testing is also subdivided based on respective units of graphics processing within the respective regions being considered, such as for respective draw calls and/or sets of draw calls within the regions being considered. Thus in this case therefore, shader program variants will be tested and selected for, e.g., respective draw calls or sets of draw calls within a respective region that the render output has been divided into for this purpose, with the shader program variants correspondingly being tested and selected for the, e.g., respective draw calls or sets of draw calls for one or more of, and in an embodiment all of, the other regions that the render output has been divided into.

Other arrangements would, of course, be possible.

The different variants of the shader program that are provided to the graphics processor and executed by the shading stage of the graphics processing pipeline can differ from each other in any suitable and desired manner. Each different variant of the shader program should be, and is in an embodiment, functionally equivalent (i.e. so that it will produce the same result (output) for a given set of inputs) but will each comprise a respective different sequence of instructions to be performed when executing the shader program.

The different variants of the shader program can differ from each other in terms of their sequence of instructions in any suitable and desired manner. For example, it could be that each shader program includes the same set of instructions, but in a different order. Additionally or alternatively, the different variants of the shader program could contain different instructions in their respective sequences of instructions.

Thus, in an embodiment, each variant of the shader program differs from the other variants of the shader program in terms of one or more of: the order of the instructions in the sequence of instructions for the variant of the shader program; and the type of instructions in the sequence of instructions for the variant of the shader program.

Thus the different variants of the shader program should, and in an embodiment do, produce the same end result, but will differ from each other in respect of their instruction encodings and/or instruction orderings.

Varying the instruction ordering may be particularly useful and desirable, for example, where the shader program includes or can include a "test" instruction that can trigger the performance of a test that could lead to the execution thread in question being killed (to a determination that the particular work item that the execution thread corresponds to no longer needs to be processed), particularly in the case where the operation of the "test" instruction (e.g. of the test that the instruction triggers) may be dependent upon the processing of other work items by the shader program (i.e. has dependencies on other execution threads and/or work items). An example of this would be instructions of the type described in the Applicant's earlier UK Patent Application GB-A-2537137 that are operable to cause a shading stage to perform a particular test operation that could result in the shader program being stopped for the execution thread in question (which could result in the execution thread in question being killed).

In such a case, there may be a trade-off between placing such a test instruction earlier in the shader program instruction sequence (as that may facilitate reducing the amount of redundant shader program execution that is performed), whilst reducing the risk of the execution hardware going idle because too many threads are stalled (in aggregate) (so there is a lack of useful threads to execute) because when the test instruction is reached there are outstanding dependencies that need to be resolved before the test instruction can be executed.

Thus, in an embodiment, the shader program includes a "test" instruction that can trigger the performance of a test that could lead to the execution thread in question being killed, and at least two variants of the shader program are provided, one in which the test instruction is earlier in the instruction sequence for the shader program, and one in which the test instruction is later in the instruction sequence for the shader program (to thereby (try to) determine whether, for the particular runtime conditions being encountered, the positioning of the test instruction earlier or later in the shader program instruction sequence is preferable).

So far as varying the instruction encoding (the particular instructions that are used in the shader program) is concerned, the Applicants have recognised that certain shader program operations (expressions) may be able to be performed using different functional execution units of a graphics processor, such that the balance and use of the execution units of the graphics processor when executing a shader program can be varied by varying the particular implementation of the shader program operations in the shader program that is issued to the graphics processor for execution.

For example, it may be possible to perform particular shader processing operations either using (more) arithmetic operations, or by using (more) load and store operations. In this case therefore, if the instruction sequence in the shader program that is issued to the graphics processor for the shader operation in question uses arithmetic operations, that may have a different affect on the efficiency of the execution of the shader program when compared to using a sequence of instructions for the shader operation that favours or uses load and store operations. Thus, the extent to which the different execution units (execution pipelines) of the graphics processor are being used when executing shader programs may be dependent upon the nature of the instructions (and the execution units that those instructions use) being executed for the shader programs. Thus, using alternative instruction encodings so as to perform the higher level shader program operations that are required in different manners (e.g. by primarily using arithmetic operations or by primarily using load and store operations), can affect the balance of the processing within the graphics processor when executing a shader program.

Thus, in an embodiment, one variant of the shader program that is issued includes instructions that will use more execution units of a particular type of the graphics processor (e.g. requires/performs more arithmetic operations), with another variant of the shader program that is issued including instructions that will use more execution units of a different type (e.g. requires/performs more load operations) (to thereby (try to) test and determine which form of operations may lead to more efficient execution of the shader program for the current runtime conditions). This could then be used, for example, to balance or more efficiently use the available graphics processing pipeline execution resources when executing the shader program, for example, and in an embodiment, so as to (try to) achieve better thread throughput for the hardware resources that are available.

The number of different variants of a shader program are considered and selected from at any one time in the manner of the technology described herein can be selected as desired. For example, it would be possible to generate and compare the performance of more than two variants of a shader program, if desired. The number of different variants that may be considered at any one time may depend, for example, on the ability of the compiler to generate the different variants sufficiently quickly for those variants to be available when required for the graphics processing in question.

Thus the graphics processor will at least (and may only) be provided with a first variant of the shader program comprising a first sequence of instructions to be performed, and a second, different variant of the shader program comprising a second sequence of instructions to be performed that is different to the first sequence of instructions to be performed when executing the first variant of the shader program. A first set of plural execution threads will then be issued and executed by the shader stage for the first variant of the shader program, and a second set of plural execution threads will be issued and executed by the shader stage for the second variant of the shader program. Either the first or second variant of the shader program will then be selected as the variant of the shader program to be executed by subsequent execution threads based on monitoring of the operation of the shader stage when executing the first set of execution threads that execute the first variant of the shader program and the second set of execution threads that execute the second variant of the shader program.

In the case where only two variants of the shader program are being considered, then this will be all that is provided to the graphics processor. When more than two variants are being considered, then the graphics processor will correspondingly be provided with a third variant (and, in an embodiment, a fourth variant, and so on, as desired).

In an embodiment only two variants of a shader program are generated and considered at any one time, particularly in the case where the compilation process is happening, in effect, in real time while the graphics processing is proceeding.

Once the different variants of the shader program have been provided to the graphics processor, those variants are executed by issuing plural execution threads to the programmable shading stage (to the programmable processing circuitry, e.g. execution unit(s)) in question.

The execution threads that are issued to the shading stage to execute the shader program will represent appropriate "work items" for the shader program in question. Thus they may, for example, represent vertices for a vertex shading program, or fragments for a fragment shading program, etc. (A given fragment may have a single or plural sampling points associated with it (e.g. in a multi-sampling arrangement), and may correspond to a single pixel (but need not do so). There may also be plural fragments per pixel (e.g. because of sample-rate shading of multi-sampled buffers or because of multiple layers).)

The execution threads can be issued to the shading stage (to the programmable processing circuitry (execution unit(s)) for execution by any suitable and desired component or element of the graphics processing unit (graphics processor) that operates as the graphics processing pipeline. In an embodiment there is a thread spawner that operates to issue the execution threads, e.g. and in an embodiment, to a programmable execution unit of the graphics processing unit (graphics processor) that executes the shader program for the execution threads.

The plural execution threads issued to the shader stage initially so as to cause the shader stage to execute plural execution threads for each variant of the shader program for the purpose of monitoring the operation of the shader stage when executing the different variants of the shader program can be selected and issued to the shader stage as desired. In an embodiment, execution threads are (initially) issued for each variant of the shader program in roughly (and, in an embodiment, in substantially) equal proportions, and in an embodiment in (substantially) equal numbers, so that each different variant of the shader program will be executed a similar (the same) number of times. In an embodiment the execution threads for the different variants of the shader program are issued in a suitable, and in an embodiment a (sufficiently) random (pseudorandom), issue pattern, so as to (try to) avoid the particular render output content distribution biasing the results of the monitoring of the operation of the shader stage when executing the different variants of the shader program.

It would be possible to issue a sequence of execution threads for one variant of the shader program, followed by a sequence of execution threads for another (the other) variant of the shader program (such that, for example, only one variant of the shader program would be being executed at any one time) (and in one embodiment this is what is done). Alternatively, in another embodiment, execution threads that will execute different variants of the shader program are interleaved (issued in an interleaved manner), so that there will be active execution threads executing plural (e.g. each) different variants of the shader program at the same time during the monitoring process.

The initial execution threads may all be issued to the same processing core, or may be distributed across different processing cores, as desired (and, e.g., depending on the operation of the graphics processor).

The initial execution threads that are issued to the shader stage for the purpose of monitoring the operation of the shader stage when executing the different variants of the shader program could comprise execution threads that will perform actual work (that will process actual work items) that is required for the render output being generated (and in one embodiment this is the case). For example, and in an embodiment, execution threads could be issued so as to process a particular region of the render output for the purposes of monitoring the operation of the shader stage when executing the different variants of the shader program over that particular region of the render output.

Additionally or alternatively, the initial execution threads that are executed for the purpose of monitoring the operation of the shader stage when executing the different variants of the shader program could be configured so as to perform test processing such as processing test primitives that are issued specifically for the purposes of testing the operation of the shader stage when executing the different variants of the shader program.

It would also be possible to configure the execution thread issue so as to allow "early" performance measures to be gathered for a work unit (e.g. draw call) before the majority of the execution threads for the work unit in question have been issued.

In one embodiment, a different set of execution threads (work items) is issued for each different variant of the shader program.

It would also be possible to issue the same set of execution threads (process the same work items) for each of the different variants of the shader program (i.e. such that each variant of the shader program will perform the same operations whilst the operation of the shader stage is being monitored). This will result in some redundant processing (as each different variant of the shader program will, in effect, duplicate the work of the other variants of the shader program being considered), but may provide a more accurate comparison of the differences in the operation of the shader stage when executing the different variants of the shader program.

Other arrangements would, of course, be possible.

The operation of the shader stage when executing the execution threads for the different variants of the shader program can be monitored in any suitable and desired manner. This may be done, for example, and in an embodiment, by tracking and collecting statistics about the operation of the shader stage when executing the execution threads for the different variants of the shader program. Thus, for each different variant of the shader program, a respective set of statistics about the operation of the shader stage when executing the execution threads for that variant of the shader program will be collected.

In an embodiment the monitoring is done in such a manner so as to be able to compare the operation of the shader stage when executing the execution threads for each different variant of the shader program, such that, e.g., and in an embodiment, the operational efficiency when executing different variants of the shader program can be compared.

In an embodiment, the monitoring of the operation of the shader stage when executing the execution threads for the different variants of the shader program comprises measuring thread execution performance when executing execution threads for the different variants of the shader program.

This may be monitored and assessed in any suitable and desired manner, for example by monitoring the average throughput of threads (e.g. in terms of the number of threads that complete per clock cycle), and/or the throughput in terms of particular graphics processing work (e.g. the number of clock cycles to complete the shader execution for a work item and/or to produce an output for a particular portion (e.g. each region, such as a rendering tile in a tile-based graphics processing system) of the render output in question).

Other thread execution performance measures can also or instead be used if desired, such as a measure of the number of instructions that are executing in a particular time period (e.g. clock cycle), a measure of the program execution latency, a measure of thread latency, and/or, in the case where the shader program includes a dependent test instruction (e.g. of the type discussed above), a measure of the number of execution threads that are stopped (killed) by that instruction and/or a measure of the number of threads that are stalled (blocked) by that instruction, etc.

Other arrangements would, of course, be possible.

In an embodiment, the thread execution monitoring is continued even after a variant of the shader program has been selected.

The thread execution monitoring can be performed by any suitable and desired circuitry of the graphics processor. In an embodiment, the graphics processor includes and uses suitable performance counters (trackers) for this purpose. This could be done using performance monitoring circuitry that is present in the graphics processor for other purposes as well, or circuitry could be specifically provided for the purposes of the technology described herein.

The selection of a variant of the shader program to use for subsequent execution threads can be made after any suitable and desired period of monitoring of the operation of the shader stage when executing the execution threads for the different variants of the shader program.

In an embodiment, the selection is done once the operation of the shader stage when executing execution threads for the different variants of the shader program has been monitored for a particular, in an embodiment selected, in an embodiment predefined, period. The particular period could in this regard be measured in terms of time, a number of particular events, and/or in terms of a particular amount of graphics processing work (e.g. a number of work items and/or a particular portion (e.g. region) of a render output), being completed. Other arrangements would, of course, be possible.

In one embodiment, the monitoring period is measured in terms of a number of execution thread issues, and/or a number of clock cycles (operation cycles) that have been performed. Thus, in an embodiment, the operation of the shader stage when executing the execution threads for the different variants of the shader program will be monitored for a particular, in an embodiment selected, in an embodiment predetermined number of thread issues and/or number of clock cycles, with the selection of the variant of the shader program to be executed by subsequent execution threads then being made after that particular number of thread issues and/or clock cycles has been performed.

In another embodiment, the operation of the shader stage when executing the different variants of the shader program is done whilst processing a particular, in an embodiment selected, in an embodiment predetermined, portion of the overall render output being generated, such as, and in an embodiment, a particular region (portion) of the overall area of the render output in question. In the case of a tile-based graphics processor and graphics processing pipeline, this portion of the overall render output area being generated could be determined as a respective number of processing tiles, such that the operation of the shader stage when executing the different variants of the shader program will be done for a particular number of processing tiles, with the variant of the shader program to be used, e.g. for the remaining tiles, then being selected at that point.

The monitoring period (e.g. the number of thread issues, the number of cycles, and/or the render output region) in this regard can be selected as desired. In an embodiment it is selected as being an appropriate portion of the overall period (e.g. the number of thread issues or number of clock cycles or area of the render output) for which the shader program will be executed when generating the render output.

The Applicants believe that monitoring the performance of the shader stage when executing execution threads for the different variants of the shader program for a few percent (e.g. 1%) of the overall operation of the shader stage when executing the shader program when generating the render output in question would be an appropriate period over which to monitor the operation of the shader stage before selecting the variant of the shader program to be executed by subsequent execution threads (as there will be a trade-off between monitoring the operation of the shader stage when executing the different variants of the shader program for a sufficient period to obtain a sufficiently reliable measure of the operation of the shader stage when executing different variants of the shader program whilst still benefiting from the subsequent selection of the variant of the shader program to use for the remaining execution of the shader program).

Thus, for example, the monitoring may be done for of the order of tens of thousands of cycles (e.g. 50,000 to 100,000 clock cycles) before selecting the variant of the shader program to be executed by subsequent execution threads. Correspondingly, in the case of a tile-based graphics processor and graphics processing pipeline, the monitoring may be done, e.g. for 1% of the overall number of processing tiles being processed, with the variant of the shader program to be used for the remaining tiles then being selected at that point.

In an embodiment, the two (or more) variants of the shader program being considered are executed for a particular test region of the overall render output (area) being generated, and the results of the processing for that test region are used to select the variant of the shader program to use for the remainder of the (area of) the render output.

In this case, the test region, in an embodiment, comprises a small portion (area) of the overall render output, such as a region comprising, e.g. a few percent of the area of the overall render output. The test region could, e.g., be located anywhere within the overall render output area, such as at one corner or edge, or in the centre of the render output.

Within the test region, in an embodiment different sub-regions within that region are processed using the respective different variants of the shader program being considered, in an embodiment in an interleaved, e.g. checkerboard, fashion so as to try to avoid any structural bias to the results of the shader program variant testing.

In an embodiment, the arrangement of testing a test region is done for each of plural respective regions that the overall render output (area) has been divided into. In this case therefore, the overall render output will be subdivided into a plurality of regions, and within each such region, there will be a respective test region (area) for which the variants of the shader program are tested, with the results from the test region then being used to select the shader program variant to use for the rest of the render output region in question.

In these arrangements, the processing of a test region (and, in an embodiment, of plural test regions) could be, and in an embodiment is, configured to be done (and is done) in advance of the processing of the remainder of the region in question (that the test region relates to), such that when the remainder of the region falls to be processed, the test region processing has already been done.

In an embodiment, the arrangement is such that the overall render output (e.g. frame) being generated is subdivided into a plurality of regions, with the process then operating for each respective region that the render output has been divided into, to process a sub-region of that region using execution threads that execute all the different variants of the shader program being considered, with the results of the operation of the shader stage when processing the respective sub-region then being used to select the variant of the shader program to use when processing the remainder of the region of the render output in question using the shader program in question.

The variant of the shader program to be executed by subsequent execution threads that are to execute the shader program may be selected based on the monitoring of the operation of the shader stage when executing execution threads for the different variants of the shader program in any suitable and desired manner.

In an embodiment, the variant of the shader program that is found to have the better thread execution performance (e.g. measured in terms of the average thread throughput) is selected as the variant of the shader program to be executed by subsequent execution threads.

In an embodiment, the operation of the shader stage for the different variants of the shader program (e.g. the thread execution performance for the different variants of the shader program) is compared, and a variant of the shader program (e.g., and in an embodiment, the variant having the "better" performance (e.g., and in an embodiment, the more efficient thread execution performance)) is selected to be executed by subsequent execution threads that are to execute the shader program based on the comparison. This will then have the effect of allowing the subsequent execution threads to be biased towards executing the variant of the shader program that has, e.g., and in an embodiment, been determined to be more efficient for the current runtime conditions, so as to (try to) improve the overall performance of the graphics processing system when executing the shader program for the current runtime conditions.

As well as using the performance measures when executing the different variants of the shader program, the shader program variant selection process could also use other information if desired (and in one embodiment this is done). For example, the shader program variant selection process could also use (and in an embodiment does use) other runtime condition information and parameters. It could also or instead, and in an embodiment also, use other information relating to the shader program variants being executed, such as "static" parameters of the shader program variants, such as the number and/or type of instructions of the shader program variants, the numbers of particular instruction types in the and each shader program variant, etc. The shader program variant selection process could also use variant selection information determined from other (e.g. earlier) shader program variant testing, if desired.

Once the variant of the shader program to use for the subsequent threads has been selected, then subsequent threads that are to execute the shader program will be configured to execute the selected variant of the shader program.

The subsequent threads that are issued to execute the shader program once the variant of the shader program to use for the subsequent threads has been selected should be, and in an embodiment are, threads that are performing actual, useful, "work" for the render output in question, thus they should, and in an embodiment do, each correspond to a work item for the shader program for the render output being generated.

In an embodiment, the subsequent execution threads comprise execution threads that are for a remaining amount of graphics processing to be done for the particular unit of graphics processing in question that is being considered. Thus they may, for example, and in an embodiment, be some or all of the remaining threads for the render output (e.g. frame) in question, for the draw call or set of draw calls in question, and/or for the region or regions of the render output in question.

It would be possible to cause all the subsequent execution threads that are to execute the shader program to execute the selected variant of the shader program once the monitoring and selection process has been completed (at least until such time as a new selection operation is triggered) (and in one embodiment this is what is done).

However, in an embodiment, the arrangement is such that some subsequent execution threads are still configured to execute the other (non-selected) variant or variants of the shader program even after the preferred variant of the shader program has been selected. In other words, it is preferred to continue to still issue some threads that will execute the "non-selected", e.g. less efficient, shader program variant or variants, even after it has been determined which shader program variant is selected (preferred) (e.g. the more efficient).

This will then allow, for example, the system to still monitor the operational effectiveness of the shader stage when executing the currently unselected (e.g. less preferred) variant programs, which may then facilitate identifying changes to which of the variants of the shader program may be the more efficient, e.g. due to changes to the runtime conditions (e.g. while the render output in question is being generated).

Thus, in an embodiment, once the selection process has been triggered and a variant of the shader program to be executed by subsequent execution threads has been selected based on the monitoring of the operation of the shader program when executing the different variants of the shader program, the subsequent thread issue is configured such that the selected variant of the shader program is to be executed by a majority of the subsequent execution threads that are to execute the shader program, but such that some but not all (a minority) of subsequent execution threads that are to execute the shader program will still execute the other variant or variants of the shader program that were not selected based on the monitoring of the operation of the shader stage when executing the different variants of the shader program. In general it is preferred that less than or no more than 5% of the subsequent threads still execute the non-selected variant or variants of the shader program (the more threads that execute the non-selected variant(s), the more likely the process is to detect changing conditions, but the more the benefits of selecting a shader program variant are eroded).

Correspondingly, in one embodiment, once a variant of the shader program to be executed by subsequent execution threads has been selected, all of the subsequent execution threads (or at least the selected portion of the subsequent execution threads that is to execute the selected variant of the shader program) are set to execute the selected variant of the shader program immediately (i.e. the process immediately proceeds to use the selected variant of the shader program for the subsequent execution threads).

In another embodiment, the process operates, once a variant of the shader program to be executed by subsequent execution threads has been selected, to progressively increase the proportion of subsequent execution threads that execute the selected variant of the shader program, e.g. until such time as all (or the selected portion) of the subsequently issued execution threads are executing the selected variant of the shader program. This would then allow the system to progressively increase the number of execution threads that are executing the selected variant of the shader program, rather than immediately switching, e.g. all, of the subsequent execution threads to execute the selected variant of the shader program.

It would be possible solely to prepare two (or more) variants of the shader program initially, and then to test and select between those two (or more) variants of the shader program for the remainder of a graphics processing task in question, such as for an image or sequence of images being rendered.

However, in an embodiment, a new shader program variant selection process is performed periodically, e.g. at particular, in an embodiment selected, e.g. predefined, intervals (which may be defined in terms of time, or otherwise). This will allow, for example, changes in runtime conditions to be taken into account.

In one such embodiment, each time a new "unit" of a particular unit of graphics processing work that is being considered is started, a new variant selection process is triggered. Thus, for example, each time a new render output and/or a new draw call and/or a new region of a render output, is begun for a particular shader program, the operation in the manner of the technology described herein is repeated so as to test and select an appropriate variant of the shader program for that particular unit of graphics processing work. Thus the operation in the manner of the technology described herein is in an embodiment repeated (at least) when a new unit of graphics processing work that is being considered is started (to be started) for a shader program.

Such a unit of graphics processing work could, and in an embodiment does, comprise a new render output, such as an image (e.g. frame) to be generated by the graphics processing system, although other arrangements would be possible. For example the unit of graphics processing work could comprise a sequence of render outputs, such that a new variant of shader program will be considered every other render output or every third render output, etc., or it could be a defined unit of graphics processing within a particular render output, such as when a particular (area) portion such as a quarter or half, or number of processing tiles, of the render output has been generated.

In an embodiment, as well as or instead of (and in an embodiment as well as) considering new variants of a shader program periodically in the manner discussed above, monitoring of the operation of the programmable shading stage when executing the shader program is continued after a variant of the shader program has been selected, and a new shader program variant testing and selection process can be, and is in an embodiment, triggered on the basis of that monitoring. In an embodiment, the monitoring of the operation of the programmable shading stage after the preferred variant of the shader program has been selected is used to determine if the operation of the shading stage using the selected variant of the shader program has fallen below a particular, in an embodiment selected, in an embodiment predetermined, threshold level of performance, and if (when) the performance does fall below that threshold level of performance, a new shader program variant testing and selection process is triggered.

Other arrangements would, of course, be possible.

When a new shader program variant testing and selection process is triggered, then it would be possible simply to retest the previously considered variants of the shader program (and in one embodiment that is what is done). However, in an embodiment, at least one new variant of a shader program is considered every time a new shader program variant testing and selection process is started.

In such an embodiment, the operation is configured to generate and progressively test different variants of the shader program over time. For example, and in an embodiment, a first pair of variants of a shader program could be produced and tested initially, with the preferred variant of that first pair of shader program variants being identified, with then a third variant of the shader program subsequently being generated and tested and compared to the preferred variant from the first and second variants of the shader program (when the next "variant" selection is triggered), with the preferred variant of the first preferred variant and the third variant of the shader program then being identified, and then, subsequently, being tested against another (fourth) variant of the shader program, and so on (if desired).

This would then allow the process to progressively test successive variants of a shader program, so as to, for example, progressively search for and identify a more optimal variant of the shader program to execute. For example, the progressive changing of the variants of the shader program could be used so as to perform, e.g., a "converging" search within a range of possible variants of the shader program towards a more optimal variant of the shader program. This could be used, for example, where, as discussed above, the variants differ from each other in respect of the positioning of a dependent test instruction within the sequence of instructions in the shader program, so as to test, e.g., initially, having that shader test instruction towards the beginning or towards the end of the sequence of instructions, and to then progressively move that test instruction within the sequence of instructions based on the results of the testing of the variants of the shader program so as to try to converge the variants of the shader program towards a more optimal position for the test instruction in the shader program for the current runtime conditions being encountered.

In an embodiment of this arrangement, the different variants of the shader program are progressively generated and tested for respective render outputs in a sequence of render outputs, such as a sequence of frames, being generated. Thus, for example, and in an embodiment, first and second variants may be assessed for a first render output (e.g. frame), with a third variant then being generated and tested for the next render output (e.g. frame), and a fourth variant then being generated and tested for the next render output (e.g. frame), and so on.

Other arrangements would, of course, be possible.

Although it is generally preferred to select the variant of a shader program to use in the manner discussed above, the Applicants have recognised that there may be circumstances where selecting a variant of a shader program based on performance measures in the manner of the technology described herein may be less desirable or inappropriate, for example depending upon the particular runtime conditions being encountered. For example, if the device in which the graphics processor is operating is experiencing energy usage problems (such as thermal limitations and/or low battery conditions), it may be preferable to use the most energy efficient variant of the shader program, even if that is the less optimal variant of the shader program to use from a performance perspective.

Thus, in an embodiment, the method of the technology described herein comprises (and the graphics processing system is operable to) reverting to a, in an embodiment particular, in an embodiment selected, in an embodiment predetermined, default shader program variant operation (usage) when (if) a particular condition or conditions is met (is occurring).

The particular condition or conditions in this regard could comprise, e.g., particular, e.g. selected, e.g. predefined, energy usage of the overall system, or any other system parameter, as desired.

The default shader program variant operation that is selected when the particular condition or conditions is met can correspondingly comprise any suitable and desired default shader program operation. For example, the system could be configured to default to the most energy-efficient shader program operation, irrespective of the performance otherwise of that shader program variant. Alternatively, the default operation could be to use both (or all) the different shader program variants, e.g. for respective, different, regions of the render output (e.g., and in an embodiment, such that for the overall render output, both (or all) different variants of the shader program will be used in a distributed fashion across the overall render output and for roughly equal proportions of the overall render output (area)). This should then have the effect that the overall operation will effectively be the average of the operation of the two (or more) different variants of the shader program, and so while not being (potentially) the most optimized way of operating the shader program, equally should not be the worst performance case for the shader program in question.

The different variants of the shader program should be, and are in an embodiment, generated by the compiler (the shader compiler) for the graphics processor and graphics processing pipeline in question. Thus the compiler in an embodiment determines and generates the appropriate variants of the shader program from the (high level) shader program code that is provided, e.g. by the application on the host processor that requires the processing by the graphics processor in the graphics processing pipeline.

The compiler may, e.g., and in an embodiment does, run on a host processor of the overall data processing system that includes the graphics processor and graphics processing pipeline (i.e. such that the graphics processing pipeline is then executed on another, graphics processor, that is associated with the host processor). In this case, the compiler and compiled code would run on separate processors within the overall data processing system. However, other arrangements would be possible, such as the compiler running on the same processor as the compiled code, or the compiler being run on a (completely) separate processor, such as the program being pre-compiled on a separate system being distributed in a compiled form.

The technology described herein also extends to and includes the operation of the compiler itself.

Thus, in an embodiment, the method of the technology described herein further comprises, for a shader program to be executed by the programmable shading stage to perform graphics shading operations, first compiling (generating) at least two variants of the shader program to be executed by the programmable shading stage, each variant of the shader program comprising a different sequence of instructions to be performed when executing the shader program (and then providing the at least two variants of the shader program to the graphics processor).

Correspondingly, the graphics processing system of the technology described herein in an embodiment comprises a compiler (compiler processing circuitry) that is operable to generate at least two variants of a shader program to be executed by a programmable shading stage of the graphics processing pipeline to perform graphics shading operations, each variant of the shader program comprising a different sequence of instructions to be performed when executing the shader program.

In these arrangements the compiler (the compiler processing circuitry) in an embodiment is part of and executes on a central processing unit (CPU), such as a host processor, of the graphics processing system, and in an embodiment is part of a driver for the graphics processor that is executing on the CPU (e.g. host processor).

The compilation process (the compiler) can generate the at least two variants of the shader program in any suitable and desired manner, e.g., and in an embodiment, using any suitable and desired compiler techniques for that purpose.

The operation in the manner of the technology described herein to provide plural variants of a shader program to be executed can be (and in one embodiment is) considered for each and every shader program that is to be executed by the graphics processor and the graphics processing pipeline. It would also be possible to generate different variants of shader programs for only particular, e.g. selected, categories or types of shader programs, but not for other categories or types of shader programs (e.g. where a type or category of shader program is likely to have similar performance irrespective of the actual arrangement of the shader program and/or when it may be difficult to generate variants of a shader program that are likely to have different performance characteristics in use). Thus it is not necessary that each and every shader program has to have plural different variants generated for it, for example where the compiler determines that testing different variants for the shader program may not be so useful for the shader program in question.

In an embodiment, the techniques of the technology described herein are used for and with a "multi-core" graphics processor. Thus, in this case, the graphics processor will include plural sets of respective programmable processing circuitry (e.g. shader cores (execution units)) that are each operable to execute execution threads for a given shader program in parallel. In this case, each respective set of programmable processing circuitry (shader core) is in an embodiment operable (and operates) in the manner of the technology described herein.

In such arrangements, each respective shader core could operate independently in the manner of the technology described herein (i.e. to itself test variants of a shader program and select which variant of the shader program to use), and/or there could be a centralised monitoring and selection arrangement (circuitry), e.g. in one of the shader cores, that performs that operation for plural, e.g. all, of the shader cores.

The selection of the variant of the shader program to use could be done on a global basis (for all the shader cores together), such that the operation of one or more or all of the shader cores could be monitored and then a variant of the shader program selected that all of the shader cores will use for subsequent execution threads, or the variant of the shader program to use could be tested and selected for each shader core (or subset of the shader cores) separately.

The latter arrangement may be more suitable where different shader cores are processing different regions of a render output, for example. Thus in the latter case, for example, the operation of each shader core (or of respective subsets of the shader cores) could be monitored independently, and a respective, independent, shader program variant selection made for each respective shader core (or subset of shader cores).

Other arrangements would, of course, be possible.

The Applicants have further recognised that as well as testing different variants of a shader program to be executed, it would also be possible to consider, in a similar manner, different variants of other factors and parameters that control the operation of a graphics processor and graphics processing pipeline when generating a render output, such as, in particular, and in an embodiment, state settings (state parameters) that are used to control the operation of a graphics processor and graphics processing pipeline when generating a render output. For example, different variants of the render state settings, such as whether early or late depth (and stencil) testing is enabled or not, could be tested in a similar manner, to determine if there is a preferred variant of those render state settings for improving the performance of a graphics processing pipeline when generating a render output.

Thus, in an embodiment, as well as testing different variants of a shader program and then selecting a preferred variant of the shader program to use, the method of the technology described herein also comprises (and the graphics processing system is also configured to) testing (in a corresponding and similar manner) different variants of state settings, and in particular render state settings, for generating the render output in question. In this case, the different render state settings could comprise, for example, whether early or late depth (and stencil) testing is enabled.

In this case, the state settings (e.g. render state settings) may, e.g., be set for a given render output as a whole, and/or may be set for respective units of graphics processing within the render output, such as for respective draw calls. Thus, for example, different variants of the render state settings could be considered for respective draw calls and/or for the render output as a whole, e.g., and in an embodiment, in the manners discussed above for the shader program variants. Correspondingly, once the operation for the different variants of the (render) state settings has been monitored, the system could then operate to select a preferred (render) state setting to use for, e.g., the remainder of the graphics processing work "unit" (e.g. render output) in question. Again, the, e.g. render, state settings to use could be retested periodically, if desired.

It is believed that the testing of variants of, e.g. render, state settings in this manner may be new and advantageous in its own right, and not just when also considered in combination with the testing and selection of shader program variants.

Thus, a further embodiment of the technology described herein comprises a method of operating a graphics processor that performs graphics processing operations in accordance with graphics processing operation state settings, the method comprising:

for a graphics processing operation to be performed by the graphics processor when generating a render output:
  providing to the graphics processor at least two variants of the state settings to be used when performing the graphics processing operation, each variant of the graphics processing operation state settings comprising a different graphics processing operation state setting to be used when performing the graphics processing operation;
  for each variant of the graphics processing operation state settings, performing the graphics processing operation for a part of the render output in accordance with the graphics processing operation state settings for the variant;
  monitoring the operation of the graphics processor when performing the graphics processing operation for a part of the render output in accordance with the graphics processing operation state settings for the different variants of the graphics processing operation state settings;
  based on the monitoring of the operation of the graphics processor when performing the graphics processing operation for a part of the render output in accordance with the graphics processing operation state settings for the different variants of the graphics processing operation state settings, selecting a variant of the graphics processing operation state settings to be used when performing the graphics processing operation for a further part of the render output; and
  performing the graphics processing operation for a further part of the render output using the selected graphics processing operation state settings.

A further embodiment of the technology described herein comprises a graphics processing system comprising:

a graphics processor that performs graphics processing operations in accordance with graphics processing operation state settings;
the graphics processing system further comprising:
processing circuitry operable to provide for a graphics processing operation to be performed by the graphics processor when generating a render output, at least two variants of state settings to be used when performing the graphics processing operation, each variant of the graphics processing operation state settings comprising a different graphics processing operation state setting to be used when performing the graphics processing operation;
and
the graphics processor further comprising:
graphics processing circuitry operable to, for each variant of the graphics processing operation state settings, perform the graphics processing operation for a part of the render output in accordance with the graphics processing operation state settings for the variant;

monitoring circuitry operable to monitor the operation of the graphics processor when performing the graphics processing operation for a part of the render output in accordance with the graphics processing operation state settings for the different variants of the graphics processing operation state settings;

and graphics processing operation state settings selection circuitry operable to:

select a variant of the graphics processing operation state settings to be used when performing the graphics processing operation for a further part of the render output, based on the monitoring of the operation of the graphics processor when performing the graphics processing operation for a part of the render output in accordance with the graphics processing operation state settings for the different variants of the graphics processing operation state settings;

and to:

cause the graphics processing circuitry to perform the graphics processing operation for a further part of the render output using the selected graphics processing operation state settings.

As will be appreciated by those skilled in the art, these embodiments of the technology described herein can, and in an embodiment do, include any one or more or all of the features of the technology described herein discussed herein, as appropriate.

Thus, for example, the monitoring, testing, and selection of the, e.g. render, state setting variants can be, and is in an embodiment, performed in a corresponding manner to that discussed above for monitoring, testing and selecting shader program variants. The graphics processing operation may comprise rendering all or part of a render output, such as rendering a draw call for a render output, etc.

The graphics processor and graphics processing pipeline of the technology described herein will be and is in an embodiment part of an overall graphics processing system that will include, e.g., and in an embodiment, a host processor that, e.g., executes applications that require graphics processing by the graphics processor. The host processor will send appropriate commands and data to the graphics processor to control it to perform graphics processing operations and to produce graphics processing (render) output required by applications executing on the host processor. To facilitate this, the host processor should, and in an embodiment does, also execute a driver for the graphics processor and a compiler or compilers for compiling shader programs to be executed by the programmable shading stage(s) executed by the graphics processor.

The graphics processor may also comprise, and/or be in communication with, one or more memories and/or memory devices that store the data described herein, and/or the output data generated by the graphics processor, and/or store software for performing the processes described herein. The graphics processor may also be in communication with a host microprocessor, and/or with a display for displaying images based on the data generated by the graphics processor.

As well as any programmable processing (shader) stages, the graphics processor and graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are, in an embodiment, exported to external, e.g. main, memory, for storage and use, such as to a frame buffer for a display.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system and processor can otherwise include any one or more or all of the usual functional units, etc., that graphics processing systems and processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes, in conjunction with said data processor, said graphics processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad aspect the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processing unit (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 5 that is executed by the graphics processor 3 in the present embodiments in more detail.

The graphics processing pipeline 5 shown in FIG. 2 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipelines 5 that are relevant to the operation of the present embodiments. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 5 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3.

The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 5.

The rasterisation stage 25 of the graphics processing pipeline 5 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where $4x$ multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 5 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 5 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 5. This may include, as is known in the art, the creation of one or more intermediate representations of the program within the compiler.

The compiler may, e.g., run on the host processor 1 of the data processing system that includes the graphics processor 3. (The compiler may, e.g., be part of the driver 4, with there being a special API call to cause the compiler to run. The compiler execution can thus be part of the draw call preparation done by the driver in response to API calls generated by an application).

However, other arrangements would be possible, such as the compiler running on the same processor as the compiled code, or the compiler being run on a separate processor, such as the program being pre-compiled on a separate system and being distributed in a compiled form.

FIG. 2 shows schematically the operation stages of the graphics processing unit 3.

FIG. 3 shows functional units of the graphics processing unit 3 that are used to perform (and thus to act as) various ones of the processing operations and stages of the graphics processing pipeline 5 shown in FIG. 2. (There may be other functional units in the graphics processing unit 3.)

As shown in FIG. 3, the graphics processing unit 3 includes a rasteriser 40, a thread spawner 41, a programmable execution unit 42, a varying interpolator 43, a texture mapper 44, a blender 45, and a set of registers 46.

The thread spawner 41 is operable to spawn execution threads for execution by the programmable execution unit 42, e.g. for fragments that it receives from the rasteriser 40.

The programmable execution unit 42 operates to execute shader programs to perform the shader operations of the graphics processing pipeline, such as the hull shader, the vertex shader and the fragment shader. To do this, it receives execution threads from the thread spawner 41 and executes the relevant shader program for those execution threads. As part of this operation, and as shown in FIG. 3, the execution threads will read data from and write data to respective registers 46.

As part of this processing, and as shown in FIG. 3, the programmable execution unit 42 can call upon the varying interpolator 43, the texture mapper 44 and the blender 45 to perform specific graphics processing operations. To do this, the programmable execution unit will send appropriate messages to the relevant accelerator (and receive the appropriate response therefrom), e.g. in response to specific instructions in a shader program that it is executing.

The varying interpolator 43 operates to interpolate values across graphics primitives, and, as part of this operation, often creates texture coordinates to be used for sampling graphics textures.

The texture mapper 44 operates to sample graphics textures using texture coordinates, e.g. generated by the varying interpolator 43, and produces therefrom a filtered texture sample result (which it can then return to the programmable execution unit 42 for use, e.g. when shading sampling points).

The blender 45 operates to blend, e.g., fragment shading results generated by the programmable execution unit 42 with previously generated fragment shader results, such as results that are already stored in the tile buffer and/or the frame buffer.

As discussed above, the programmable execution unit 42 executes shader programs to be executed for execution threads that it receives from the thread spawner 41 to perform graphics processing operations.

A number of embodiments for the execution of shader programs by execution threads in the programmable execution unit 42 will now be described with reference to FIGS. 4 to 10.

In the present embodiments, when a shader program is to be executed, the compiler prepares two (or more) different variants of the shader program for execution by the relevant shader stage of the graphics processing pipeline 5. Execution threads are then issued to cause the shader stage to execute the different versions of the shader program and the operation of the graphics processor 3 and graphics processing pipeline 5 when using the different variants of the shader program is monitored, to then select a preferred variant of the tested shader program variants to execute for subsequent execution threads.

Figure 4:
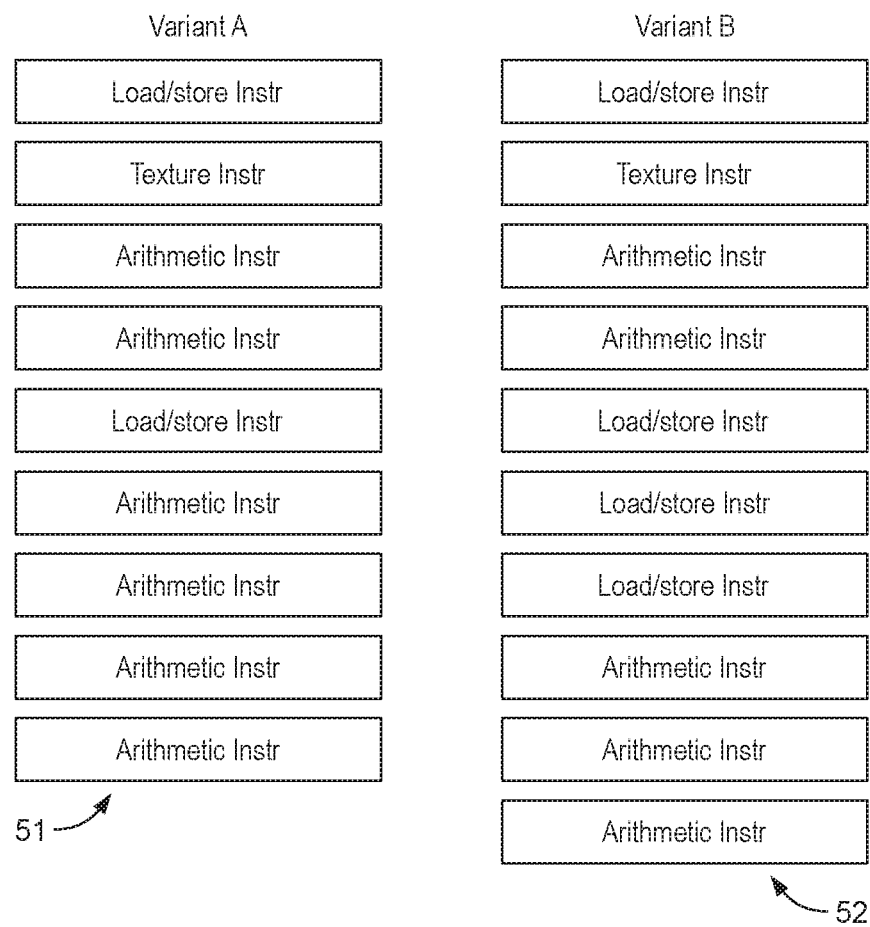
FIGS. 4, 5 and 6 show examples of variants of shader programs that can be considered in embodiments of the technology described herein.
Figure 5:
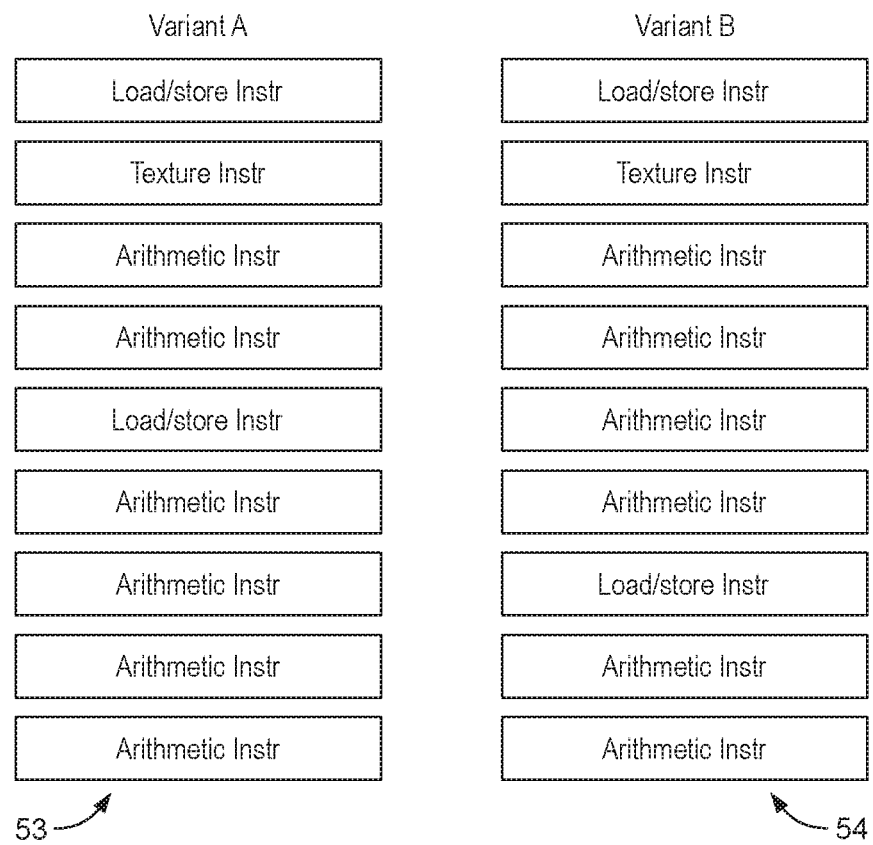
Figure 6:
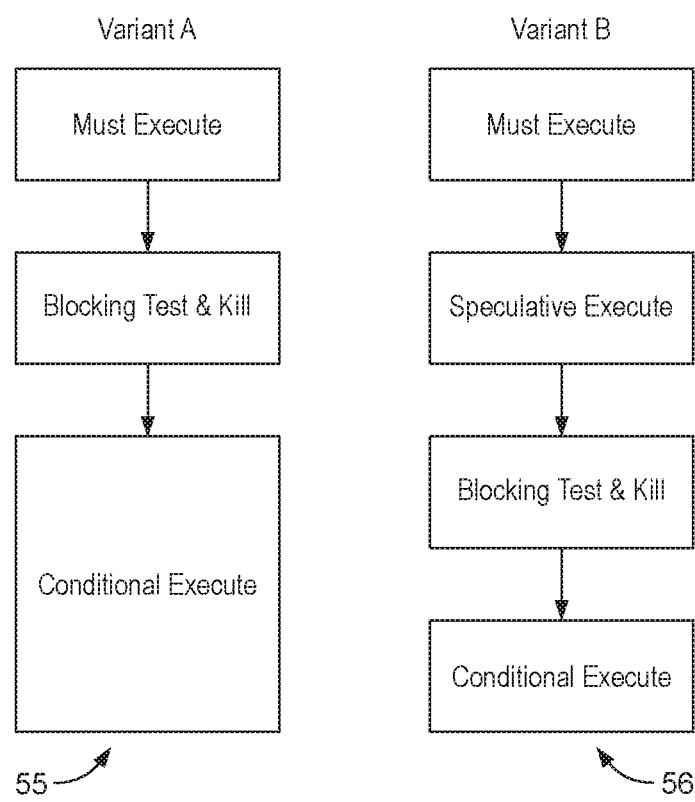

FIGS. 4, 5 and 6 show exemplary variants of respective shader programs that may be used and considered in the embodiments of the technology described herein. These respective variants of a shader program will be generated by the compiler for the shader in question, and appropriately provided to the graphics processor 3 for execution by the programmable execution unit 42.

FIG. 4 shows respective variants 51, 52 of a shader program that differ in respect of their instruction mix, e.g. with the aim of balancing the use of different execution pipelines that may be available in the graphics processor 3 (this will be discussed in more detail with respect to FIG. 7 below).

In the examples shown in FIG. 4, it is assumed that the graphics processor can execute one arithmetic instruction, one load/store instruction and one texture instruction per clock cycle. If so, then the first shader program variant 51 has a six cycle critical path (it has six arithmetic instructions), whereas the second variant has a five cycle critical path (five arithmetic instructions), but includes more load/store instructions so places more pressure on the load/store pipeline (which might be loaded due to other shader programs that are running).

FIG. 5 shows respective variants 53, 54 of a shader program that differ in terms of their instruction scheduling (instruction order). The overall set of instructions for the variants is the same, but the relative ordering (scheduling) of the particular instructions within each variant differs. In particular, the positioning of the load/store instructions in the sequence differs, such that the relative ordering of memory access and non-memory access processing will be different for the different variants of the shader program. This could allow, e.g., for different temperal balancing of functional units and/or of memory access patterns depending upon which different variant of the shader program is being used.

FIG. 6 shows two variants 55, 56 of a shader program that includes a "test" instruction of the type described, e.g., in the Applicant's earlier UK Patent Application GB-A-2537137, that can lead to a determination that an execution thread no longer needs to be executed (but that equally, because of dependencies, can "block" (stall) the execution of execution threads)).

In this example, the first variant 55 has less work before the "test" instruction (so less instructions, but more dependencies), whereas the other variant 56 puts some (speculative) work before the "test" instruction (so will execute more (potentially unnecessary) instructions before the test instruction, but will have fewer dependencies when the test instruction is executed, such that the test instruction may be less likely to stall further progress of an execution thread or threads).

In the present embodiments, the issuing of execution threads that will cause the shader stage to execute the different versions of the shader program (e.g. as illustrated in FIGS. 4, 5 and 6) is done for a particular portion of the overall area of the render output (e.g. image) being generated, with the results of the processing of that render output area using the different variants of the shader program then being used to select the shader program variant to use for some or all of the remaining render output area.

Figure 7:
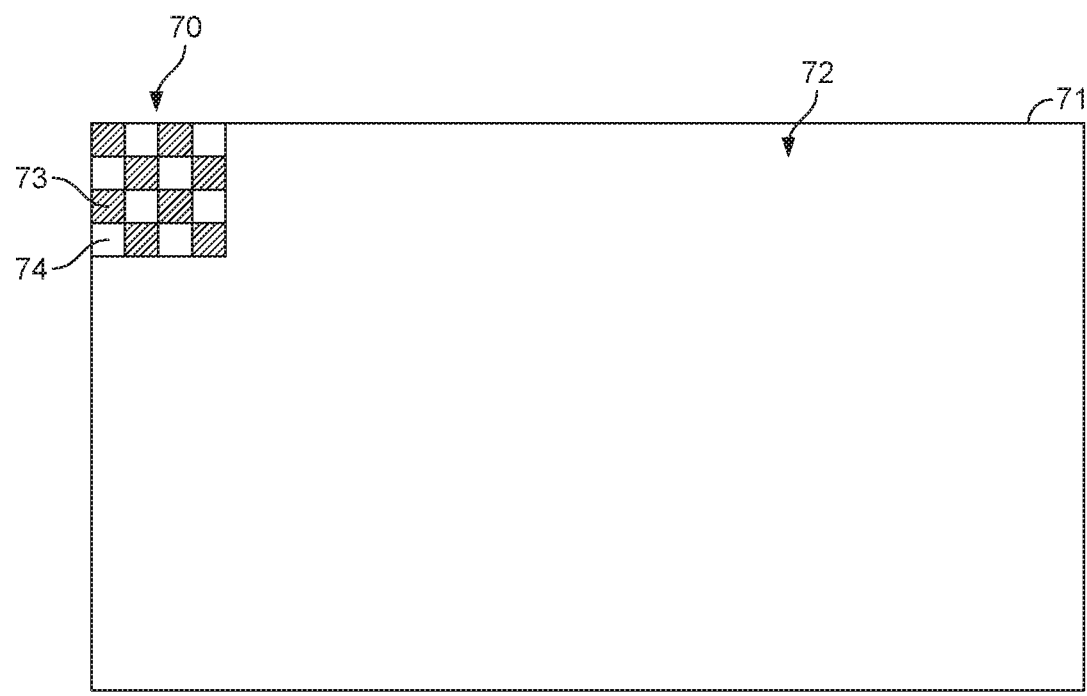
FIGS. 7 and 8 show exemplary shader program variant test regions used in embodiments of the technology described herein.
Figure 8:
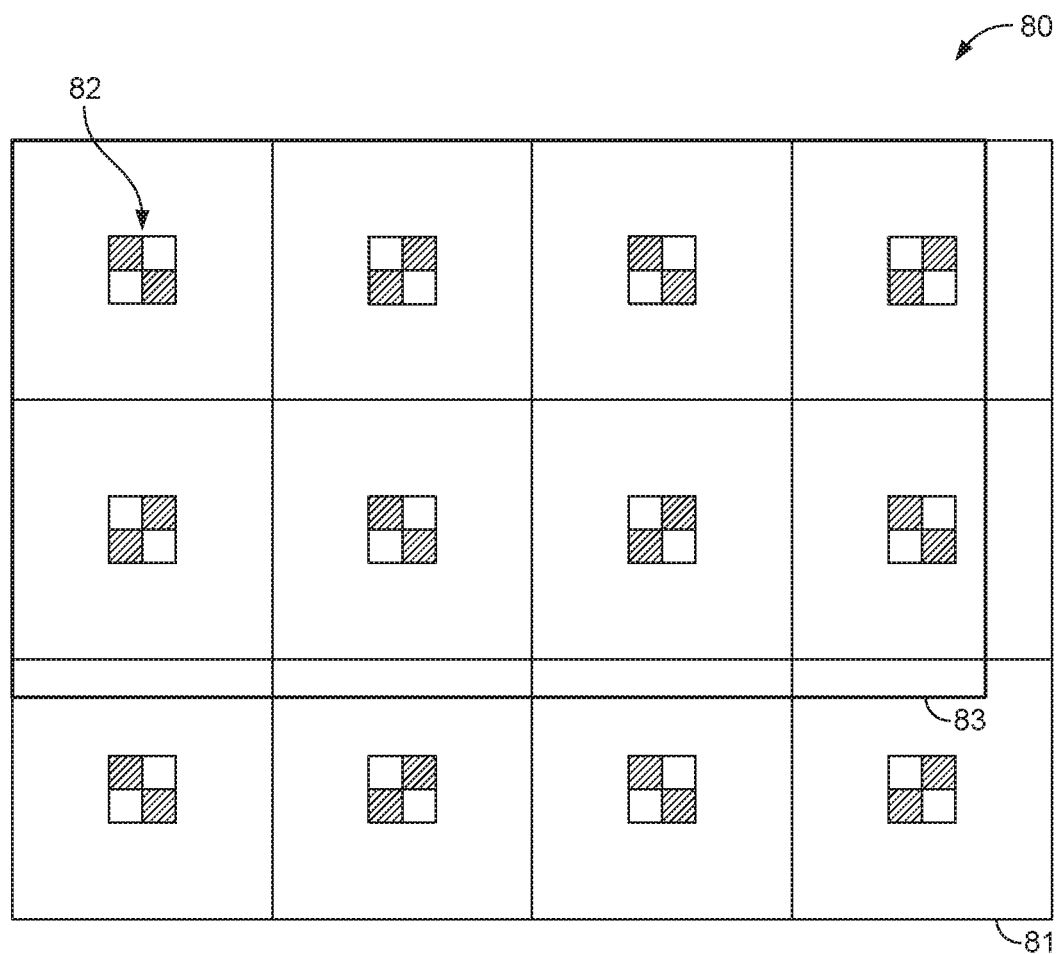

FIGS. 7 and 8 show two versions of this that can be used in the present embodiments.

FIG. 7 shows an arrangement in which two different variants of a shader program are used (and tested) for a particular portion 70 of an overall render output 71 that is being generated, with the result of the processing of the portion 70 being used to select which shader program variant to use for the remainder 72 of the render output 71. In this case, as shown in FIG. 7, within the "test" region 70, different sub-regions 73, 74 are processed using the different shader program variants. Moreover, the different shader program variant sub-regions are interleaved, so as to try to avoid any structural bias in the results. (The different shaded boxes in FIGS. 7 (and 8) show respective regions for which a particular variant of a shader program will be executed for testing purposes.)

In this example, the initial test portion (region) 70 of the render output could, for example, comprise a 256×256 sampling position (e.g. pixel) region. It should also be noted that although FIG. 7 shows the test region 70 as being in the top-left corner of the overall render output 71, it could in practice be located anywhere within the overall render output 71, such as in the centre of the render output. The test region 70 is processed earlier than the rest of the render output 71, so that the selection of which shader program variant to use can be made in advance of processing the rest of the render output 71.

FIG. 8 shows an alternative arrangement in which rather than simply testing one "test" region for the overall render output 71 as is shown in FIG. 7, the overall render output 80 is divided into a plurality of regions 81, and a separate test region 82 is processed using the different variants of the shader program for each region 81 separately (with the results for a given test region 82 then being used to select the variant of the shader program to use for the remainder of the region 81 in question). In this case each respective region 81 will have its own, independent, shader program variant selection made for it.

In this case, the regions 81 that the overall render output 80 is divided into could comprise, for example, 512×512 pixels with the test regions 82 being 64×64 pixel regions (and thus testing two 32×32 sub-regions for each variant of the shader program (where two variants are being considered)).

The test regions 82 are again processed earlier than the rest of their corresponding region 81, so that the selection of which shader program variant to use can be made in advance of processing the rest of the region 81.

Again, although the test regions 82 are shown as being in the centre of their respective regions 81, other arrangements, such as them being arranged at one edge or one corner of the regions would be possible, if desired.

FIG. 8 also shows an exemplary 1080p screen overlay 83.

It can be seen that for certain parts of the screen overlay, there will be no testing performed (as the normal testing region 82 lies outside of the area that will actually be rendered for the 1080p screen overlay), or the region that would be rendered for the screen overlay 83 will, in effect, have an off-centre test region. In the latter case, the process could simply still use an off-centre test region, or the test region could be re-centred inside the visible screen region, if desired. For screen regions with no test region, then the process could, for example, simply choose a shader program variant for that screen region, move the test region location to be within the screen region that will be rendered, or select a variant based on a bordering region for which a test region was processed, etc.

It will be appreciated that in the arrangements shown in FIGS. 7 and 8, depending upon where in the render output the work item (e.g. fragment (e.g. pixel)) that an execution thread relates to is located, then either the execution thread will be in a "test region" for which different variants of the shader program are being tested, or will be in a "non-testing" region and so will, in these embodiments at least, be configured to execute a preferred shader program variant based on prior "testing" data.

Figure 9:
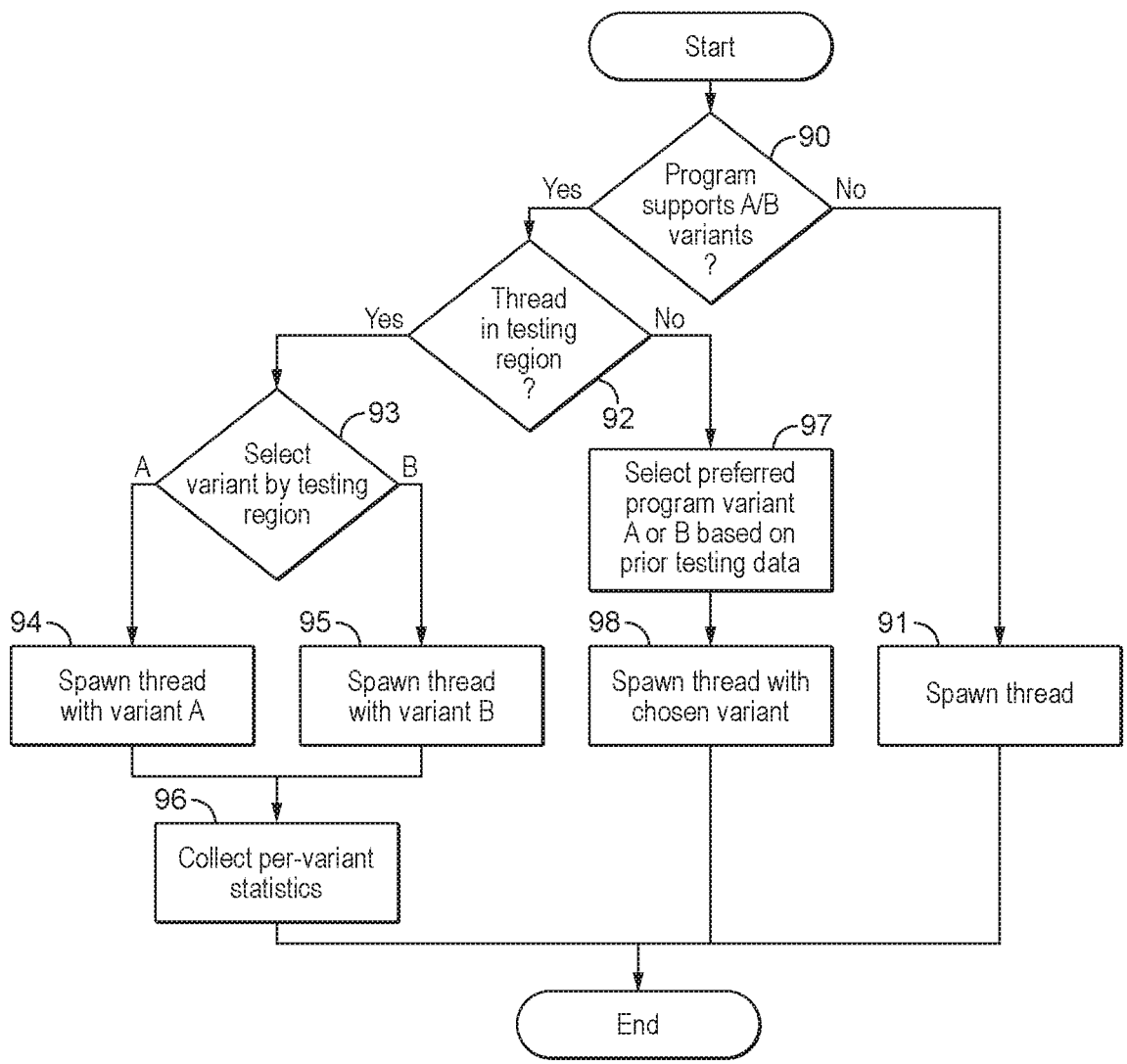
FIG. 9 shows schematically the issue of threads executing different variants of a shader program in embodiments of the technology described herein.

FIG. 9 is a flow chart illustrating this operation.

As shown in FIG. 9, the process starts by first determining if the shader program in question supports plural (in this case two) different variants or not (step 90). (If the shader program does not support different variants, then an execution thread that executes the single variant of the shader program is simply spawned (issued) (step 91).)

If the shader program does support different variants, it is then determined whether the execution thread relates to work item (e.g. fragment (e.g. pixel)) that is located in the determined testing region for the render output in question (as illustrated in FIGS. 7 and 8 for example) (step 92).

If the thread is for a work item located in the testing region, then the appropriate variant of the shader program for the thread to execute is tested based on which particular part of the testing region the thread is for (step 93), and the thread is spawned (issued) so as to execute the appropriate variant of the shader program accordingly (steps 94, 95).

Performance statistics are then collected for the threads that execute the different variants of the shader program in the testing region (step 96), to assess the operation of the graphics processor when executing the execution threads for the different variants of the shader program.

This may comprise, for example, measuring thread execution performance when executing execution threads for the different variants of the shader program, such as the average throughput of threads (e.g. in terms of the number of threads that complete per clock cycle), and/or the throughput in terms of particular graphics processing work (e.g. the number of clock cycles to complete the shader execution for a work item and/or to produce an output for a particular portion (e.g. each region, such as a rendering tile in a tile-based graphics processing system) of the render output in question).

This may be done, e.g., using suitable performance counters (trackers) of the graphics processor.

On the other hand, if at step 92 it is determined that the thread does not relate to a work item that is located within the testing region of the render output, then instead the preferred program variant for the thread to use is selected based on the testing data that has been obtained from threads executing for the testing region (step 97), and the execution thread is spawned (issued) so as to execute the selected preferred shader program variant (step 98).

In the present embodiments, the variant of the shader program that is found to have the better thread execution performance (e.g. measured in terms of the average thread throughput) is selected as the variant of the shader program to be executed by execution threads that do not relate to the test region.

As well as using the performance measures when executing the different variants of the shader program, the shader program variant selection process could also use other information if desired. For example, the shader program variant selection process could also use other runtime condition information and other information relating to the shader program variants being executed, such as "static" parameters of the shader program variants, such as the number and/or type of instructions of the shader program variants, the numbers of particular instruction types in the and each shader program variant, etc.

This process is done across the entire render output area, so that each work item within the render output area is processed using an execution thread that executes a variant of the shader program, appropriately. The processing of the render output is configured such that the appropriate test region (or regions) will be processed first, so that appropriate testing data is available for selecting the shader program variant to use for the remainder of the render output area.

Figure 10:
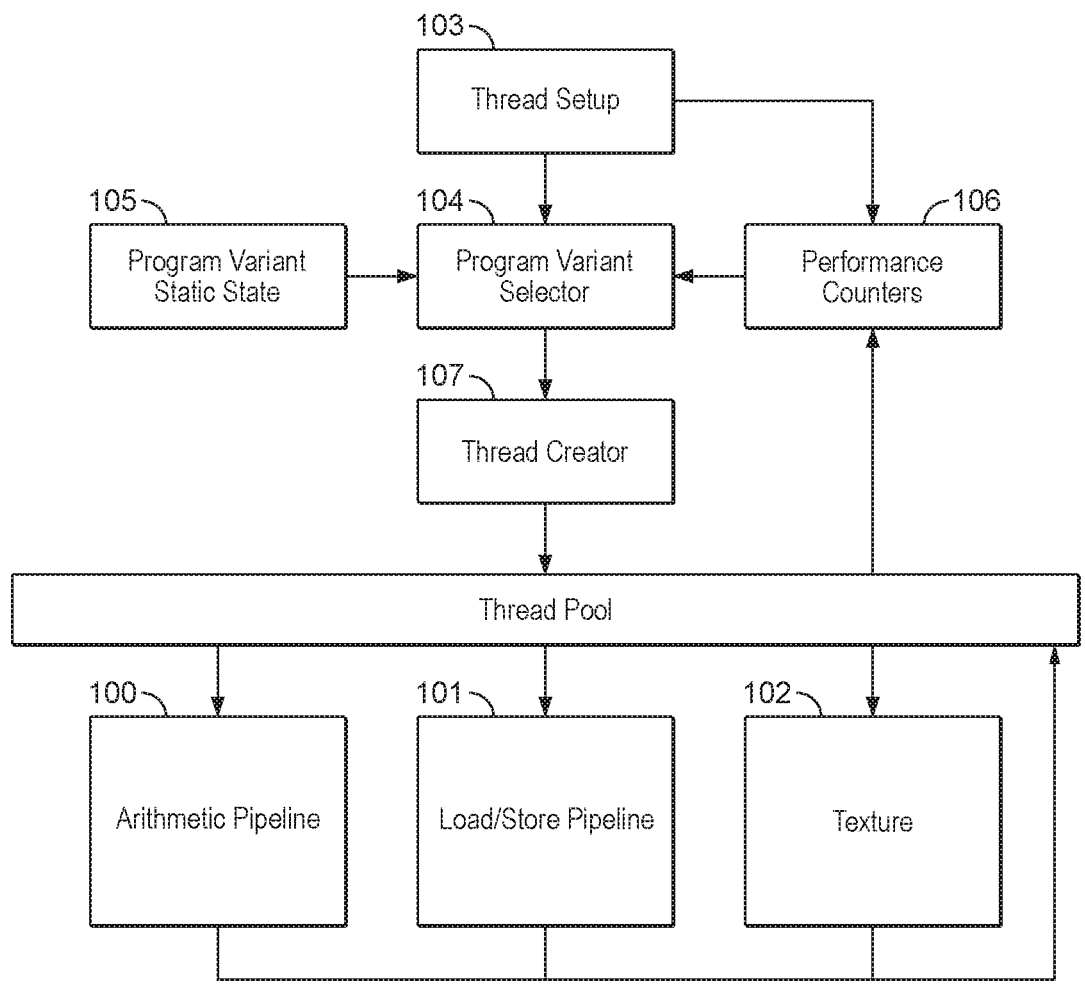
FIG. 10 shows schematically the operation of a graphics processing unit in embodiments of the technology described herein.

FIG. 10 schematically illustrates this operation and shows the selection of a shader program variant and then the issue of execution threads to functional units of the graphics processor accordingly.

FIG. 10 shows the graphics processor 3 as effectively including three functional unit pipelines, namely an arithmetic pipeline 100, a load store pipeline 101, and a texture pipeline 102. As shown in FIGS. 4, 5 and 6, respective shader program instructions will be executed by one of these pipelines. The three different pipelines are shown to illustrate the parallel processing aspect of a graphics processor (GPU), and accordingly to illustrate the idea, as discussed, for example, in relation to FIG. 4, of using the present embodiments to balance the throughput of the different functional pipelines. For example, if one shader program is using the arithmetic pipeline 100 heavily, then it may be that a variant of another program that uses an alternative instruction sequence which primarily runs in the load store pipeline 101 (for example) would be beneficial.

In FIG. 10, the thread setup stage 103 corresponds to the compute or fragment processing frontend (e.g. tile list reader, rasteriser, early depth and stencil testing unit, etc., e.g. as illustrated in FIG. 2) (where the shader program variant being considered is a fragment or compute shader that will be executed in the fragment shading stage of the graphics processing pipeline 5).

As shown in FIG. 10, the graphics processor (GPU) 3 includes a program variant selector unit (circuitry) 104 that takes as inputs "static" state information 105 about each program variant (e.g. the number of arithmetic instructions in the variant, any predetermined variant selection information from earlier statistics, etc.) together with the current thread execution performance measures 106 (e.g. the measure of how busy the arithmetic pipeline 100 is, or the average result latency for each program variant, etc.) from the test region in question, and uses that information to select a preferred variant of the shader program to use for subsequent execution threads. The program variant selector 104 can also use runtime conditions from the thread setup stage as an input as well, if desired.

The program variant selector 104 then instructs a thread creator (spawner) 107 to create a thread that will execute the selected shader program variant accordingly.

It can be seen from the above that, in its embodiments at least, the technology described herein comprises a mechanism for identifying and using a more optimal variant of a shader program in a graphics processing system. This is achieved, in embodiments of the technology described herein at least, by testing different variants of a shader program, and then selecting the variant of the shader program to use for subsequent execution threads based on that testing.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor that executes a graphics processing pipeline which includes a programmable shading stage that executes graphics shader programs to perform graphics shading operations, the method comprising:
   for a shader program to be executed by the programmable shading stage to perform graphics shading operations:
   providing to the graphics processor at least two variants of the shader program, each variant of the shader program comprising a different sequence of instructions to be performed when executing the shader program;
   for each variant of the shader program, issuing plural execution threads for execution, so as to cause the shading stage to execute plural execution threads for each variant of the shader program;
   the shading stage executing the execution threads so as to execute plural execution threads for each variant of the shader program;
   monitoring the operation of the shading stage when executing the execution threads for the different variants of the shader program;
   based on the monitoring of the operation of the shading stage when executing the execution threads for the different variants of the shader program, selecting a variant of the shader program to be executed by subsequent execution threads that are to execute the shader program;
   issuing subsequent execution threads for execution, the subsequent execution threads being configured to cause the shading stage to execute the selected variant of the shader program; and
   the shading stage executing the subsequent execution threads so as to execute the selected variant of the shader program for the subsequent execution threads;
   wherein the variants of the shader program being considered are executed for a test region of the render output being generated, and the monitoring of the operation of the shading stage when executing the execution threads for the different variants of the shader program for that test region is used to select the variant of the shader program to use for some or all of the remainder of the area of the render output being generated.

2. The method of claim 1, wherein each variant of the shader program differs from the other variants of the shader program by one or more of: the order of the instructions in the sequence of instructions for the variant of the shader program; and the type of instructions in the sequence of instructions for the variant of the shader program.

3. The method of claim 1, wherein the monitoring of the operation of the shading stage when executing the execution threads for the different variants of the shader program comprises measuring thread execution performance when executing execution threads for the different variants of the shader program.

4. The method of claim 1, wherein the monitoring of the operation of the shading stage when executing the execution threads for the different variants of the shader program is continued after a variant of the shader program has been selected.

5. The method of claim 1, wherein the overall render output being generated is divided into a plurality of regions, and each region has a respective test region for which the variants of the shader program are tested, with the monitoring of the operation of the shading stage when executing the execution threads for the different variants of the shader program for a test region then being used to select the shader program variant to use for the rest of the render output region in question.

6. The method of claim 1, comprising selecting the variant of the shader program to be executed by subsequent execution threads that are to execute the shader program based on the monitoring of the operation of the shader stage when executing execution threads for the different variants of the shader program together with other information.

7. The method of claim 1, comprising performing a new shader program variant selection process periodically.

8. The method of claim 7, wherein at least one new variant of a shader program is considered for each new shader program variant selection process.

9. The method of claim 1, comprising reverting to a default shader program variant when a particular condition or conditions is met.

10. A graphics processing system comprising:
a graphics processor that executes a graphics processing pipeline which includes one or more programmable shading stages that execute graphics shader programs to perform graphics shading operations;
the graphics processing system further comprising:
a processing circuit operable to provide for a shader program to be executed by a programmable shading stage of the graphics processing pipeline to perform graphics shading operations, at least two variants of the shader program to the graphics processor, each variant of the shader program comprising a different sequence of instructions to be performed when executing the shader program;
and
the graphics processor further comprising:
a programmable processing circuit operable to execute execution threads so as to execute a shader program provided to the graphics processor;
an execution thread issuing circuit operable to issue, for each variant of a received shader program to be executed by a programmable shading stage of the graphics processor, plural execution threads for execution, so as to cause the programmable processing circuit to execute plural execution threads for each variant of the shader program;
a thread execution monitoring circuit operable to monitor the operation of the programmable processing circuit of the graphics processor when it is executing execution threads for different variants of a shader program;
and
a shader program variant selecting circuit operable to:
select a variant of a shader program to be executed by subsequent execution threads that are to execute the shader program based on monitoring of the operation of the programmable processing circuit when executing execution threads for different variants of the shader program by the thread execution monitoring circuit;

and to:
cause the execution thread issuing circuit to issue subsequent execution threads for execution by the programmable processing circuit, the subsequent execution threads being configured to cause the programmable processing circuit to execute the selected variant of the shader program;
wherein the variants of the shader program being considered are executed for a test region of the render output being generated, and the monitoring of the operation of the shading stage when executing the execution threads for the different variants of the shader program for that test region is used to select the variant of the shader program to use for some or all of the remainder of the area of the render output being generated.

11. The system of claim 10, wherein each variant of the shader program differs from the other variants of the shader program by one or more of: the order of the instructions in the sequence of instructions for the variant of the shader program; and the type of instructions in the sequence of instructions for the variant of the shader program.

12. The system of claim 10, wherein the monitoring of the operation of the shading stage when executing the execution threads for the different variants of the shader program comprises measuring thread execution performance when executing execution threads for the different variants of the shader program.

13. The system of claim 10, wherein the monitoring of the operation of the shading stage when executing the execution threads for the different variants of the shader program is continued after a variant of the shader program has been selected.

14. The system of claim 10, wherein the overall render output being generated is divided into a plurality of regions, and each region has a respective test region for which the variants of the shader program are tested, with the monitoring of the operation of the shading stage when executing the execution threads for the different variants of the shader program from the test region then being used to select the shader program variant to use for the rest of the render output region in question.

15. The system of claim 10, wherein the variant of the shader program to be executed by subsequent execution threads that are to execute the shader program is selected based on the monitoring of the operation of the shader stage when executing execution threads for the different variants of the shader program together with other information.

16. The system of claim 10, configured to perform a new shader program variant selection process periodically.

17. The system of claim 16, wherein at least one new variant of a shader program is considered for each new shader program variant selection process.

18. The system of claim 10, configured to revert to a default shader program variant when a particular condition or conditions is met.

19. A non-transitory computer readable storage medium storing computer software code which when executed on a processor performs a method of operating a graphics processor that executes a graphics processing pipeline which includes a programmable shading stage that executes graphics shader programs to perform graphics shading operations, the method comprising:
for a shader program to be executed by the programmable shading stage to perform graphics shading operations:
providing to the graphics processor at least two variants of the shader program, each variant of the shader program comprising a different sequence of instructions to be performed when executing the shader program;

for each variant of the shader program, issuing plural execution threads for execution, so as to cause the shading stage to execute plural execution threads for each variant of the shader program;

the shading stage executing the execution threads so as to execute plural execution threads for each variant of the shader program;

monitoring the operation of the shading stage when executing the execution threads for the different variants of the shader program;

based on the monitoring of the operation of the shading stage when executing the execution threads for the different variants of the shader program, selecting a variant of the shader program to be executed by subsequent execution threads that are to execute the shader program;

issuing subsequent execution threads for execution, the subsequent execution threads being configured to cause the shading stage to execute the selected variant of the shader program; and the shading stage executing the subsequent execution threads so as to execute the selected variant of the shader program for the subsequent execution threads;

wherein the variants of the shader program being considered are executed for a test region of the render output being generated, and the monitoring of the operation of the shading stage when executing the execution threads for the different variants of the shader program for that test region is used to select the variant of the shader program to use for some or all of the remainder of the area of the render output being generated.

* * * * *